United States Patent [19]

Coon et al.

[11] Patent Number: 5,076,001
[45] Date of Patent: Dec. 31, 1991

[54] SPRING LOADED FISHING POLE HOLDER APPARATUS

[76] Inventors: Ronny D. Coon, HCR 61, Box 15, Buxton, Oreg. 97109; Larry G. Sapp, 351 B St. N.W., Siletz, Oreg. 97380

[21] Appl. No.: 632,855

[22] Filed: Dec. 24, 1990

[51] Int. Cl.⁵ ............................................. A01K 97/12
[52] U.S. Cl. ............................................. 43/15; 43/16
[58] Field of Search .................................... 43/15, 16

[56] References Cited

U.S. PATENT DOCUMENTS

| | | | |
|---|---|---|---|
| 3,307,286 | 3/1967 | Unger | 43/15 |
| 3,410,015 | 11/1968 | Garcia, Jr. | 43/15 |
| 4,085,536 | 4/1978 | Wood, Jr. | 43/15 |
| 4,193,220 | 3/1980 | Bourquin et al. | 43/15 |
| 4,219,955 | 9/1980 | Lo Bosco | 43/15 |
| 4,397,113 | 8/1983 | Pinson | 43/15 |
| 4,676,018 | 6/1987 | Kimball | 43/15 |
| 4,730,408 | 3/1988 | Miller | 43/15 |

Primary Examiner—Richard K. Seidel
Assistant Examiner—Patty E. Hong
Attorney, Agent, or Firm—Henderson & Sturm

[57] ABSTRACT

A spring loading fishing pole holder apparatus (10) for causing a spring biased force to be applied to the butt (101) of a fishing pole (100) in response to a strike force being applied to the fishing line (102); wherein, the apparatus (10) is provided with an adjustable latching unit (14) for varying the spring biased force applied to the fishing pole (100) and, an adjustable trigger unit (15) for varying the strike force required to release the latching unit (14).

4 Claims, 1 Drawing Sheet

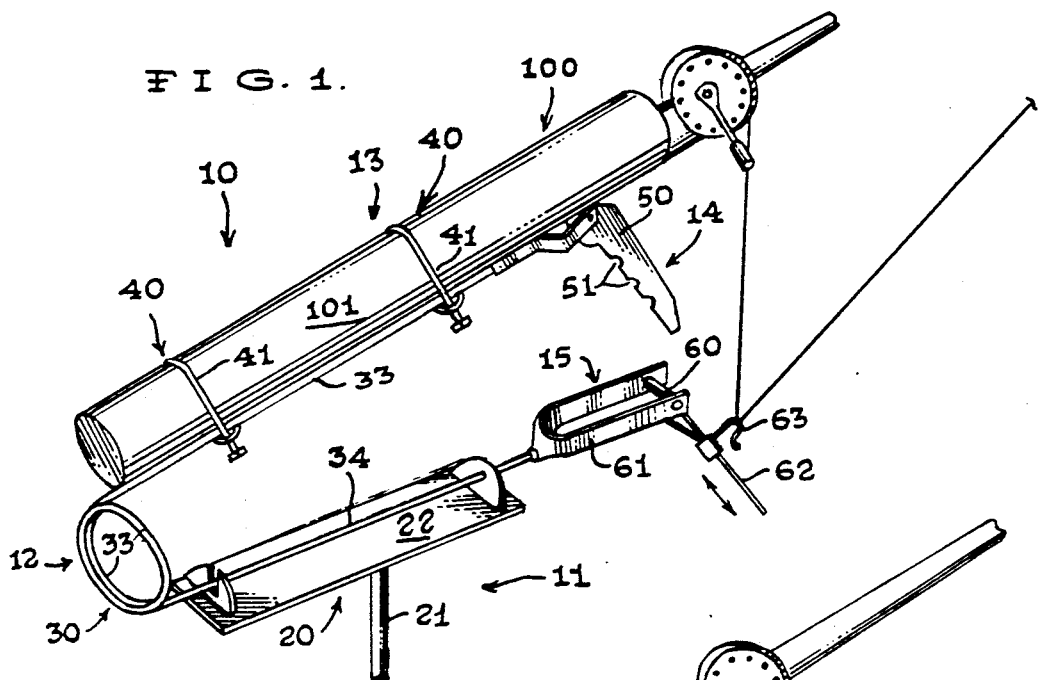

a spring loaded adjustable tension fishing rod holder wherein the force of the strike and the triggering force may be varied to accommodate different fishing conditions.

SPRING LOADED FISHING POLE HOLDER APPARATUS

TECHNICAL FIELD

The present invention relates to the field of automatic hook setting devices in general, and in particular to a spring loaded adjustable tension fishing rod holder wherein the force of the strike and the triggering force may be varied to accommodate different fishing conditions.

BACKGROUND ART

As can be seen by reference to the following U.S. Pat. Nos. 4,397,113; 4,676,018; 4,219,955; and 4,730,408; the prior art is replete with myriad and diverse spring loaded automatic fish hooking devices.

While all of the aforementioned prior art constructions are more that adequate for the basic purpose and function for which they have been specifically designed, these patented constructions do not represent the ultimate culmination of the state of the art in this particular area of technology.

Furthermore most of the prior art constructions are unduly complex; and, if they employ an adjustment capability the adjustment mechanism usually comprises a fairly complex structure that will not be bothered with, either by casual or frequent anglers.

As a consequence of the foregoing situation, there has existed a longstanding need among anglers for a simple and effective spring loaded automatic fish hooking/pole holding device wherein both the triggering and striking forces may be varied in a simple and straightforward manner; and the provision of such a construction is a stated objective of the present invention.

DISCLOSURE OF THE INVENTION

Briefly stated, the spring loaded fishing pole holder apparatus that forms the basis of the present invention comprises in general: a support unit; a spring unit; a pole engaging unit; an adjustable latching unit; and an adjustable trigger unit.

The support unit is operatively connected to the lower portion of the spring unit; wherein the upper portion of the spring unit is operatively connected to the pole engaging unit. Furthermore the adjustable latching unit is disposed on the upper end of the spring unit and the adjustable triggering unit is disposed on the lower end of the spring unit.

As will be explained in greater detail further on in the specification, the adjustable latching unit may be selectively engaged with the triggering unit to vary the force of the spring actuated strike that is imparted to the fishing pole; and, the triggering unit may be selectively varied to require either a light or a heavy tug on the fishing line to disengage the latching unit from the triggering unit.

In this manner the spring loaded fishing pole holder apparatus that forms the basis of the present invention has a variable sensitivity with regard to the strike transmitted both to and from the fishing pole and the fish.

BRIEF DESCRIPTION OF THE DRAWINGS

These and other attributes of the invention will become more clear upon a thorough study of the following description of the best mode for carrying out the invention, particularly when reviewed in conjunction with the drawings, wherein:

FIG. 1 is a perspective view of one version of the preferred embodiment of this invention; and, FIG. 2 is a perspective view of another version of the preferred embodiment of this invention.

BEST MODE FOR CARRYING OUT THE INVENTION

As can be seen by reference to the drawings, and in particular to FIG. 1, the spring loaded fishing pole holder apparatus that forms the basis of the present invention is designated generally by the reference numeral (10). The apparatus (10) comprises in general: a support unit (11) a spring unit (12); a pole engaging unit (13); an adjustable latching unit (14); and, an adjustable trigger unit (15). These units will now be described in seriatim fashion.

In both the first and second versions of the preferred embodiment depicted in FIGS. 1 and 2 the only structural component that constitutes even a slight structural distinction involves the spring unit (12).

In the first version of the preferred embodiment depicted in FIG. 1, the support unit (11) comprises a generally T-shaped support member (20) having a stem element (21) which depends downwardly from a generally flat cross-piece element (22).

In this particular version, the spring unit (12) comprises a generally U-shaped spring element (30) fabricated from an elongated length of spring steel rod (31) having a coil spring portion (32) formed intermediate its upper (33) and lower (34) elongated spring arms; wherein, the lower spring arm (34) is operatively connected to the cross-piece element (22) of the support member (20) at a location spaced from the outer end of the lower spring arm (34) by suitable securing elements (35).

As shown in FIG. 1, the pole engaging unit (13) is operatively connected to the upper spring arm (33) at a location spaced from the end of the upper spring arm (33); wherein, the pole engaging unit (13) comprises a securing bracket means (40) dimensioned to frictionally and captively engage the butt portion (101) of a fishing pole (100) in a well recognized manner.

In both versions of the preferred embodiment depicted in FIGS. 1 and 2; the securing bracket means (40) comprises a pair of generally C-shaped clamps (41) which surround both the butt (101) of the fishing pole (100) and the upper spring arm (33) to securely fasten the fishing pole (100) to the upper portion of the spring unit (12).

It should also be noted at this juncture that the securing bracket means (40) could also comprise a conventional tubular rod holder (not shown) having a threaded member projecting through its side to captively yet releasably engage the fishing pole (100) relative to the upper spring arm (33) in a well recognized fashion.

Still referring to FIG. 1, it can be seen that the adjustable latching unit (14) is operatively deployed on the outer end of the upper spring arm (33); and, the trigger unit (15) is operatively deployed on the outer end of the lower spring arm (34).

As shown in FIGS. 1 and 2, the latching unit comprises an elongated downwardly depending latch arm member (50) pivotally secured to the upper portion of the spring unit (12); wherein, the inboard face of the latching arm (50) is provided with a plurality of vertically spaced latching recesses (51), whose purpose and function will be described presently.

Still referring to FIGS. 1 and 2, it can be seen that the trigger unit (15) is operatively disposed on the lower portion of the spring unit (12). In addition the trigger unit (15) comprises a trigger bar member (60) suspended and secured between the outstretched arms of a bifurcated mounting plate (61) which is secured on its inboard end to the outer end of the lower spring arm (34).

Furthermore a downwardly depending trigger rod (62) is operatively associated with the trigger bar member (60); wherein, the trigger rod (62) is further provided with a moveable line engaging hook element (63).

As shown in FIGS. 1 and 2, the trigger bar member (60) is dimensioned to be received in a selected one of the plurality of latching recesses (51), when the upper spring arm (33) is depressed towards the lower spring arm (34).

In addition the moveable line engaging hook element (63) is adapted to be adjustably positioned along the length of the trigger rod (62) to vary the effective point of attachment of the fishing line (102) relative to the trigger bar member (60).

In operation the angler would insert the fishing pole (100) into the pole engaging unit (13) and then depress the upper spring arm (33) in the direction of the lower spring arm (34), to bring a selected recess (51) of the latch arm member (50) into engagement with the trigger bar member (60).

At this point, the line engaging hook element (63) would be selectively positioned along the length of the trigger rod (62); and, the fishing line would be brought into engagement with the hook element (63).

Now when a fish pulls on the fishing line with a predetermined amount of force, that force will be transmitted through the hook element (63) and trigger rod (62) to the trigger bar member (60), causing the outer end of the lower spring arm (34) to deflect downwardly releasing the trigger bar member (60) from engagement with the selected latching recess (51).

As mentioned previously the apparatus (10) may be selectively set to provide variable hook setting and strike releasing forces; wherein, the recesses (51) decrease in hook setting force the further away the selected recess (51) is from the fishing pole (100); and, the strike releasing force diminishes in proportion to the distance that the line engaging hook element (63) is spaced from the trigger rod (60).

In the second version of the preferred embodiment depicted in FIG. 2, the spring unit (12) comprises a generally U-shaped spring element (30) fabricated from a leaf spring (C') versus the spring steel rod (31) of the first version; and, this minor structural difference is the only distinction between the two versions.

Having thereby described the subject matter of the present invention, it should be apparent that many substitutions, modifications and variations of the invention are possible in light of the above teachings. It is therefore to be understood that the invention as taught and described herein is only to be limited to the extent of the breadth and scope of the appended claims.

We claim:

1. A spring loaded fishing pole holder apparatus for use with a fishing pole and line, wherein the fishing pole has a butt end; and, wherein the apparatus comprises:
   a support unit comprising a generally T-shaped support member
   a spring unit comprising a generally U-shaped spring member having an upper and a lower spring arm; wherein, the lower spring arm is operatively connected to the support member
   a pole engaging unit operatively associated with the upper spring arm and adapted to receive the butt end of the fishing pole
   an adjustable latching unit comprising a latching member pivotally connected to the upper spring arm and having a plurality of spaced latching recesses; and,
   an adjustable trigger unit secured on the lower spring arm and including a trigger bar member dimensioned to be received in a selected one of said plurality of latching recesses to vary the hook setting force transmitted to said fishing pole; and,
   means associated with the adjustable trigger unit for engaging the fishing line at a selected distance from said trigger bar for varying the strike force required to release the latching member.

2. The apparatus as in claim 1; wherein said means comprises a trigger rod operatively associated with the trigger bar member and depending generally downwardly with respect thereto; and further including a line engaging hook element which is disposed on, and moveable with respect to, the trigger rod.

3. The apparatus as in claim 2; wherein, said spring member is fabricated from a steel spring rod.

4. The apparatus as in claim 2; wherein, said spring member is fabricated from a leaf spring.

* * * * *